(12) United States Patent
Bindner et al.

(10) Patent No.: US 8,190,280 B2
(45) Date of Patent: May 29, 2012

(54) HEARING AID IMPRESSION BUILDABILITY INDEX COMPUTATION TOOL

(75) Inventors: Jörg Bindner, Weisendorf (DE); Tong Fang, Morganville, NJ (US); Eduard Kaiser, Forchheim (DE); Raimund Martin, Eggolsheim (DE); Fred McBagonluri, East Windsor, NJ (US); Peter Nikles, Erlangen (DE); Therese Velde, Bridgewater, NJ (US)

(73) Assignee: Siemens Corporation, Iselin, NJ (US)

( * ) Notice: Subject to any disclaimer, the term of this patent is extended or adjusted under 35 U.S.C. 154(b) by 987 days.

(21) Appl. No.: 11/910,309

(22) PCT Filed: Mar. 28, 2006

(86) PCT No.: PCT/EP2006/061101
§ 371 (c)(1),
(2), (4) Date: Apr. 23, 2008

(87) PCT Pub. No.: WO2006/103236
PCT Pub. Date: Oct. 5, 2006

(65) Prior Publication Data
US 2008/0222564 A1    Sep. 11, 2008

Related U.S. Application Data

(60) Provisional application No. 60/666,254, filed on Mar. 29, 2005.

(51) Int. Cl.
*G06F 19/00* (2006.01)
*G06T 15/00* (2006.01)

(52) U.S. Cl. .......... 700/98; 700/118; 700/163; 345/420; 382/322; 703/1

(58) Field of Classification Search .................. 700/118, 700/163, 98; 703/1, 6; 345/419, 420; 381/312, 381/322
See application file for complete search history.

(56) References Cited

U.S. PATENT DOCUMENTS

| | | | | |
|---|---|---|---|---|
| 5,487,012 A * | 1/1996 | Topholm et al. | ............... | 700/163 |
| 7,447,556 B2 * | 11/2008 | McBagonluri et al. | ......... | 700/98 |
| 7,605,812 B2 * | 10/2009 | McBagonluri et al. | ....... | 345/420 |
| 7,680,634 B2 * | 3/2010 | Boltyenkov et al. | .............. | 703/1 |

FOREIGN PATENT DOCUMENTS

| | | |
|---|---|---|
| EP | 0 508 308 A2 | 10/1992 |
| WO | WO 92/11737 | 7/1992 |
| WO | WO 02/071794 A1 | 9/2002 |

* cited by examiner

*Primary Examiner* — Albert Decady
*Assistant Examiner* — Douglas Lee
(74) *Attorney, Agent, or Firm* — Schiff Hardin LLP

(57) ABSTRACT

A method and appertaining system implement the use of manufacturing protocols for hearing aid design such that the ability to build an instrument can be displayed as a numeric parameter based on the partial numerical and metrological contributions of all the essential parameters of the given impression, and a buildability index can be displayed as a 3D virtual image of the proposed shell or preferred shell types. The method utilizes a predefined parameter table comprising parameters to utilize for a buildability determination. The buildability index is computed based on impression shape data, selected shell type, selected number of device options, data obtained from the parameter table, and data obtained from a receiver table, and the buildability index is output to a display of a user interface device or an external system.

20 Claims, 19 Drawing Sheets

| Device | Essential Determinants of Buildability |
|---|---|
| CIC | 1. Minimum and maximum aperture diameters<br>2. Minimum and maximum of second bend<br>3. Volume between the 1st and 2nd bend<br>4. Canal height from aperture to canal tip<br>5. Receiver size (X, Y, Z) |
| MC | 1. Canal Height (Average length of rays projected from the anti-tragus to an inserted plane at the crus)<br>2. Canal Depth (distance from the height point on the concha to horizontal plane at the hollowed end.<br>3. Canal width (maximum length of rays projected from the focal point of tragus to flare of concha. The maximum of the family of project rays from the tragus to the bowl or concha)<br>4. Receiver size (X, Y, Z)<br>5. Angular cut from tragus w.r.t. concha is at ~45° (Angle of attack) |
| CA | 2. Same as MC configurable are different<br>3. Angular cut from tragus w.r.t. concha is at ~45° (Angle of attack)<br>4. Volume between the 1st and aperture |

FIG. 3A

| Device | Essential Determinants of Buildability |
|---|---|
| HS OMNI | 1. Same as MC configurable are dimensionally different<br>2. Same as MC except is Angular cut from tragus w.r.t. concha is at ~30° |
| HS DIR | Same as CA except is ~30° |
| ITE DIR | 1. Canal Height (Average length of rays projected from the anti-tragus to an inserted plane at the crus)<br>2. Canal Depth (distance from the height point on the concha to horizontal plane at the hollowed end.<br>3. Canal width (maximum length of rays projected from the focal point of tragus to flare of concha. The maximum of the family of project rays from the tragus to the bowl or concha)<br>4. Volume between the 1st bend and aperture |
| ITE OMNI | Same configuration as ITE directional but different look-up table parameters |

FIG. 3B

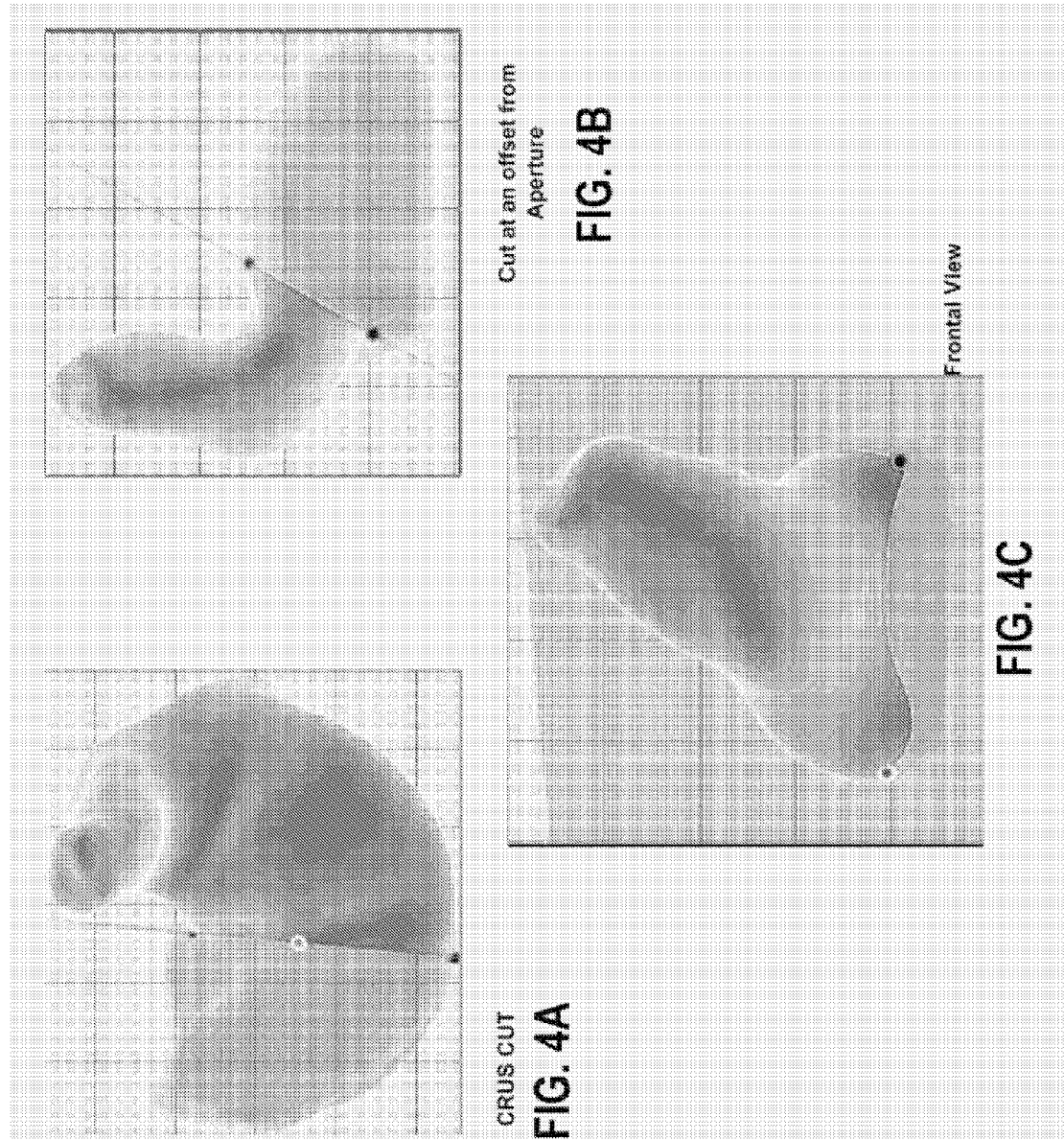

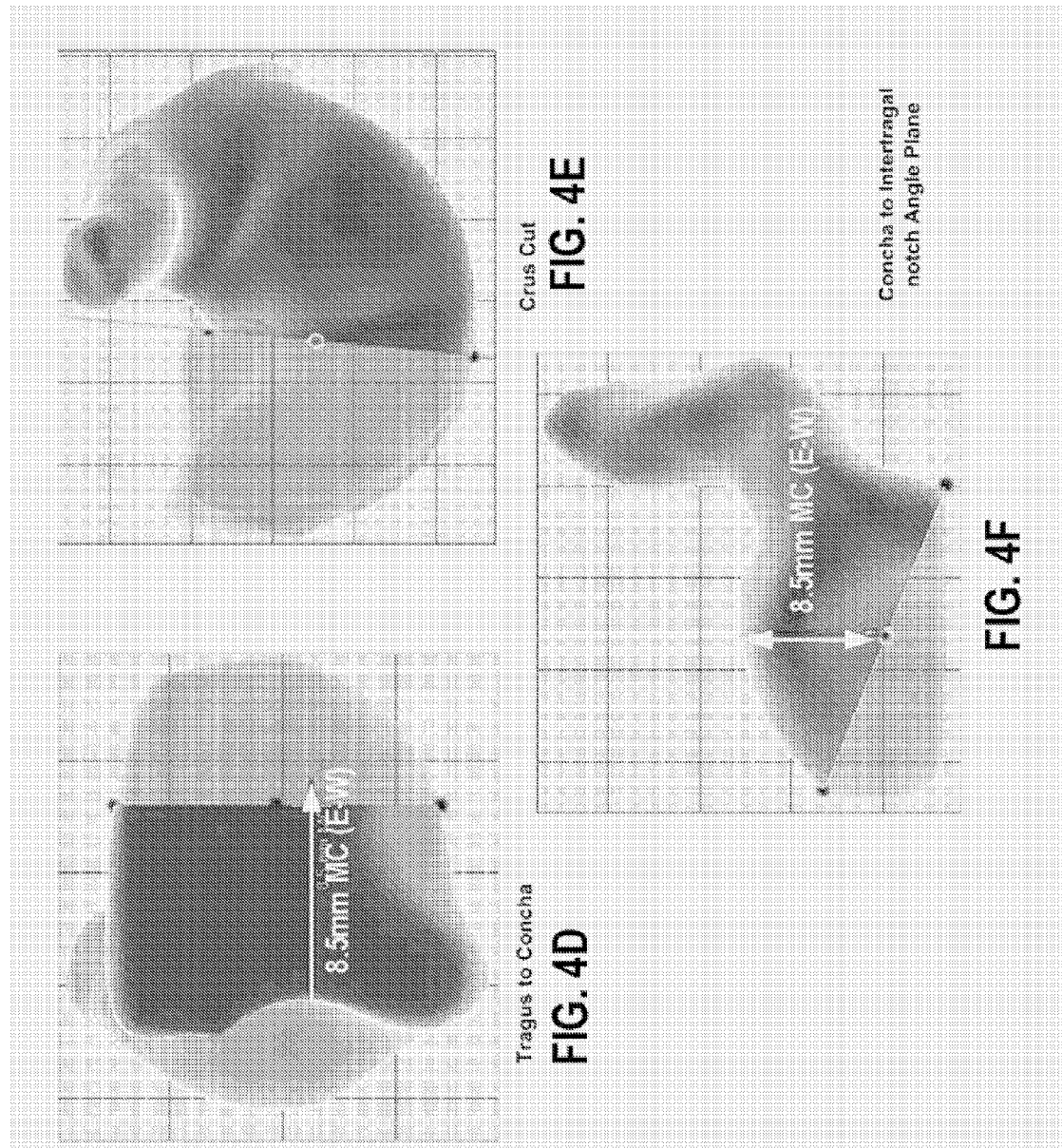

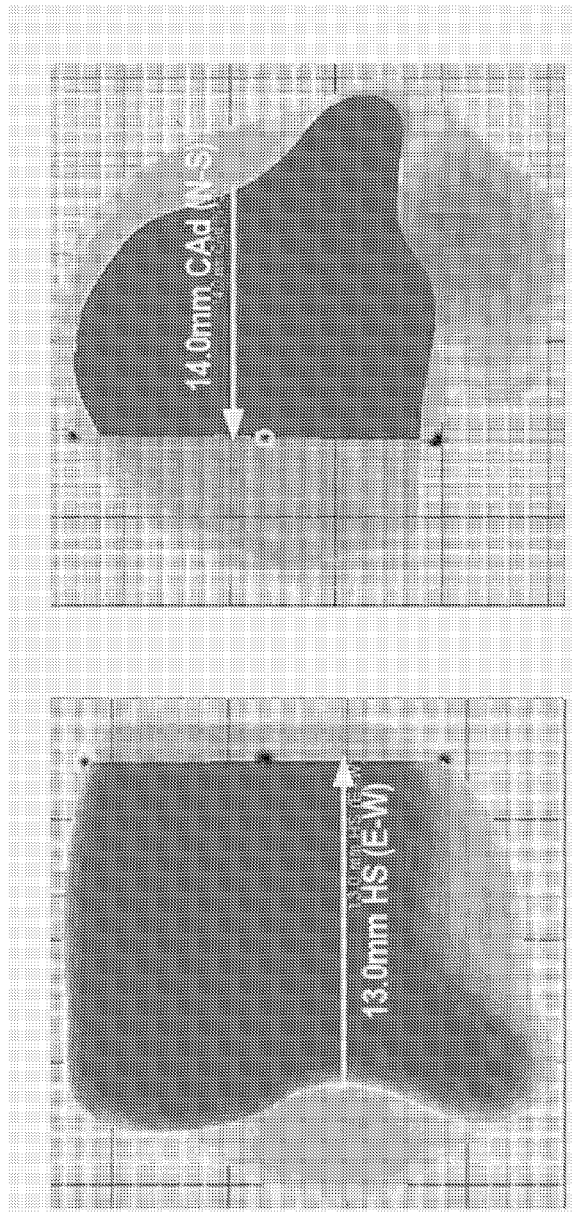
FIG. 4G Tragus to Concha
FIG. 4H Inter-Tragus to Crus/Helix
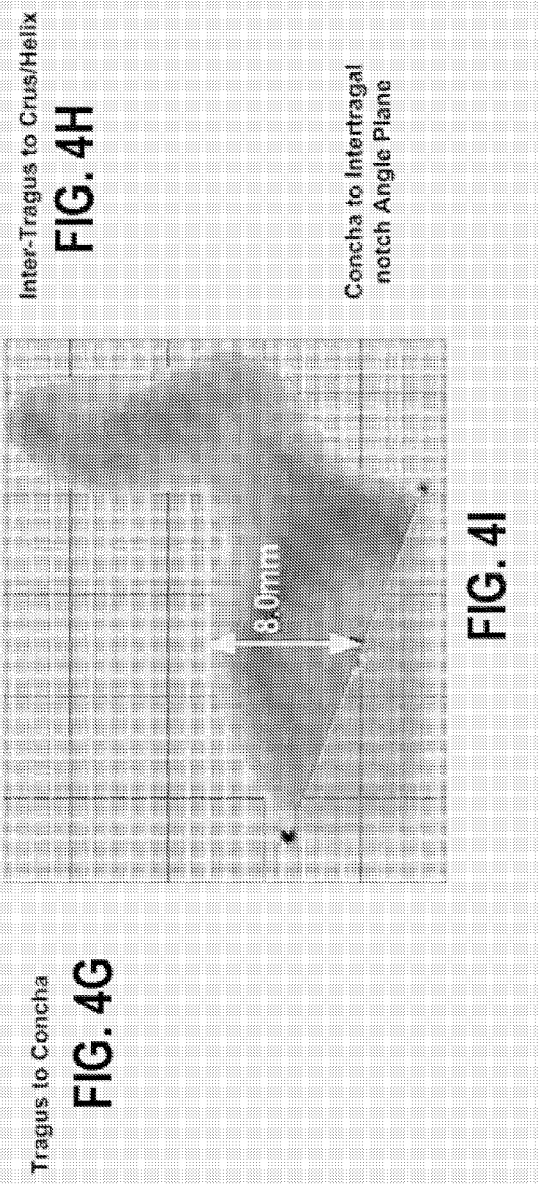
FIG. 4I Concha to Intertragal notch Angle Plane

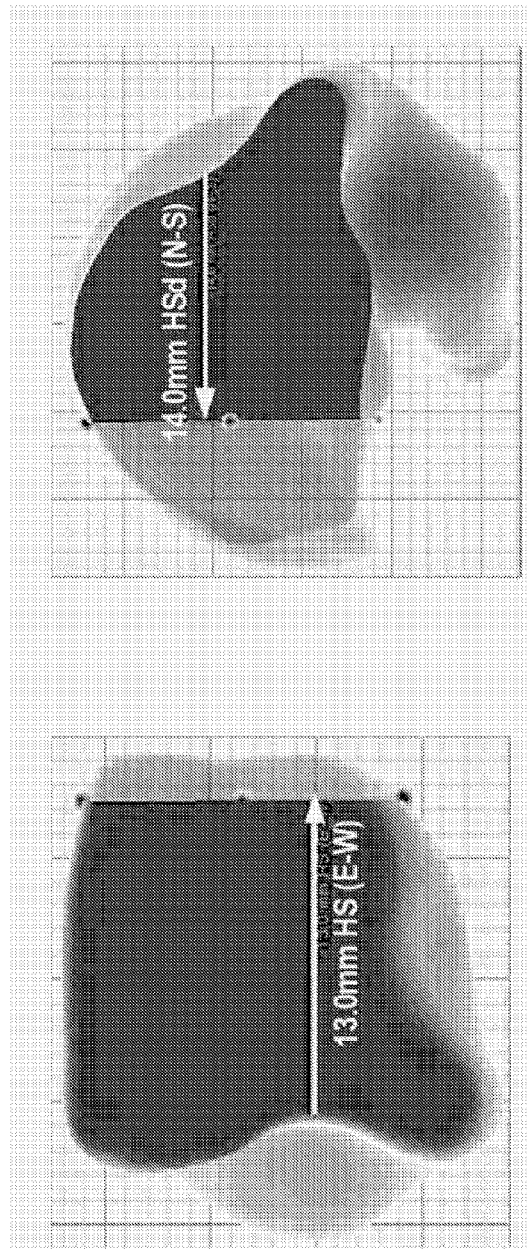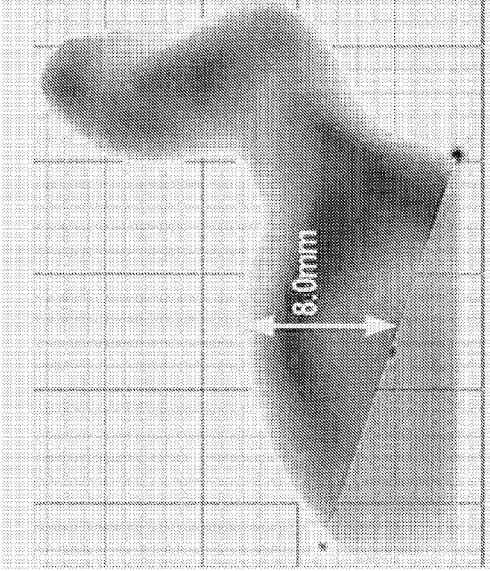

Remove Front of impression including front of helix

Insert plane at Anti-Helix, Anti-Tragus and Tragus

Distance from Helix Tip to Plane (b) Should be configurable

Concha to Bottom Plane in (B) Should be configurable

Distance from Anti-Tragus to Anti-Helix Should be Configurable as N-S
E-W should be Configurable as Distance from Lower CRUS to Concha

| Valid for Shell Type | Receiver Description | Receiver E-W | Receiver N-S |
|---|---|---|---|
| <all> | RECEIVER EJ-6552 | 4.35 | 6.11 |
| ST | RECEIVER FEF-7351-I04 | 4.00 | 5.55 |
| ST | RECEIVER EC-6368 | 3.65 | 4.32 |
| ST, HS,CA,LP | RECEIVER ED-7288-i06 | 2.98 | 4.22 |
| ST, HS, CA, LP | RECEIVER FJ-6758-000 | 2.8 | 5.12 |
| <all> | RECEIVER FC-6171 | 2.98 | 3.51 |
| <all> | RECEIVER FH-6553 | 2.58 | 2.81 |

FIG. 5

| FR Feature | CIC | MC | CA | HS | ITE |
|---|---|---|---|---|---|
| The identification of Left and Right Impressions | X | X | X | X | X |
| Tragus |  | X | X | X | X |
| Anti-Tragus |  |  |  | X | X |
| Maximal and Minimal Aperture Diameters | X |  |  |  |  |
| Aperture |  |  |  |  | X |
| Inter-Tragal Notch | X |  |  |  |  |
| Heel |  |  |  |  |  |
| Crus |  |  |  | X |  |
| Canal Tip | X |  |  |  | X |
| Concha |  | X | X |  |  |
| Concha Depth |  | X | X | X | X |
| Concha Width |  | X | X | X | X |
| Concha Height |  | X | X | X | X |
| First and Second Bends | X |  |  |  |  |
| Volume between first and Second Bends | X | X | X |  |  |
| Volume between first and aperture Bends | X | X | X | X | X |

FIG. 6

| Canal Extension | Canal Extension 1 | Canal Extension 2 | Canal Extension 3 |
|---|---|---|---|
| Global offset | Global offset 1 = X.XX | Global Offset 2 = X.XX | Global Offset 3 = X.XX |
| Local Offset | Local Offset 1 = X.XX | Local Offset 2 = X.XX | Local Offset 3 = X.XX |

FIG. 7

| Computed Parameters | Relevant Intervention Protocols |
|---|---|
| Canal Height | Canal Extension |
| Minor Axis of Canal | Global and Local Offset |
| Major Axis of Canal | Global and Local Offset |
| Minor Axis of Aperture | Global and Local Offset |
| Major Axis of Aperture | Global and Local Offset |
| Canal Depth | Global and Local Offset |
| Canal Width/Breath (E-W, N-S) | Global and Local Offset |

FIG. 8

| | Limiting Cases | Message | Manufacturing Action | "Customer" Action |
|---|---|---|---|---|
| 1 | Canal Height | Canal is too short by (X.XX mm) | Canal needs to be extended | Please Consider Re-taking impression |
| 2 | Minor Axis of Canal | Canal too narrow for selected receiver Size by (X.XX mm) | Consider a local or global offset | Impression is challenging for a CIC |
| 3 | Major Axis of Canal | Canal too narrow for selected receiver Size | Consider a local or global offset | |
| 4 | Minor Axis of Aperture | Faceplate may not fit (CIC) | Consider a global offset | Impression is challenging for a CIC |
| 5 | Major Axis of Aperture | Faceplate may not fit (CIC) | Consider a global offset | Impression is challenging for a CIC |
| 6 | Canal Depth | Battery may collide with shell | Shell change may be required | Consider Shell Change |
| 7 | Canal Width/Breath (E-W, N-S) | Faceplate may not fit | Shell change may be required Global Offset may be required Faceplate Change may be required | |

FIG. 9

| Message | Cause |
|---|---|
| The impression is bad and must be retaken | Short Canal |
| The selected device type (CIC in this case) cannot be built with the given impression. | Short Canal, Narrow Aperture, Narrow Minor Axis of Canal, Narrow Major Axis of Canal |
| The selected options will not fit the shell type selected | Narrow Aperture, Narrow Minor Axis of Canal, Narrow Major Axis of Canal |
| The selected options will not fit the shell type selected | Narrow Aperture, Minor Axis of Canal, Major Axis of Canal |

FIG. 10

HEARING AID IMPRESSION BUILDABILITY INDEX COMPUTATION TOOL

CROSS REFERENCE TO RELATED APPLICATIONS

The present application claims the benefit of U.S. Provisional Patent Application No. 60/666,254, filed Mar. 29, 2005, and is further related to the subject matter contained in U.S. patent application Ser. No. 11/347,151, filed Feb. 3, 2006, both herein incorporated by reference.

BACKGROUND

Despite the introduction of computer aided-design and manufacturing software systems into the hearing aid industry, there continue to be legacy business practices, particularly with respect to the design and manufacture of the physical hearing aid shell itself. These practices include sending a physical impression mold of a patient's ear by mail to a manufacturing site where a hearing aid shell will be produced. Furthermore, dispensers (i.e., hearing aid professionals who advise patients and recommend hearing instruments) select a shell model, electronic instrumentation and optional components on the device without any prior knowledge as to whether the preferred selection can be physically assembled into the resulting shell. With these limitations, the dispenser is repeatedly contacted during the design of the instrument when physical shell size limitations arise. This leads to long turnaround time for creating a patient's hearing aid instruments.

SUMMARY

This invention describes the implementation of manufacturing protocols such that the ability to build an instrument can be displayed as a numeric parameter based on the partial numerical and metrological contributions of all the essential parameters of the given impression. Secondly, the BIA can be displayed as a 3D virtual image of the proposed shell or preferred shell types, as the case may be.

To circumvent this prolonged delay and to ensure that the dispenser can a priori identify and modify instrument options prior to sending them to the manufacturing site and in order to allow a more efficient and practical electronic ordering of instruments, Buildability Index Computation Protocols were developed.

The present invention relates to a method for providing a buildability index for a hearing aid device shell design to a user, comprising: creating a predefined parameter table comprising parameters to utilize for a buildability determination; obtaining a set of impression shape data for a specific device; selecting a shell type from a predefined list of shell types; selecting a number of device options; computing a buildability index based on the impression shape data, the selected shell type, the selected number of device options, data obtained from the parameter table, and data obtained from a receiver table; outputting the buildability index to at least one of a display of a user interface device and an external system.

The present invention also relates to a system for providing a buildability index for a hearing aid device shell design to a user, comprising: a predefined parameter table comprising parameters to utilize for a buildability determination; a set of impression shape data for a specific device; a list of shell types; a number of device options; a receiver table; a software module that computes a buildability index based on the impression shape data, the selected shell type, the selected number of device options, data obtained from the parameter table, and data obtained from the receiver table; and an output via which the buildability index is sent to at least one of a display of a user interface device and an external system.

The present invention provides, according to various embodiments, an algorithm that implements a rule-based modeling approach to the creation and design of different hearing aid device types. It provides an index, which is based on, e.g., partial fractions expressed in a percentage of all the essential parameters that constitute a given device. Based on a threshold value, the index indicates the ability of the designer to build the selected shell type and options without (or with little) difficulty, or extreme limitations.

Requirements for physical validation protocols of impressions molds for hearing aid manufacturing have been developed. These validation protocols, referred to as a "buildability index" (BI) henceforth, are evoked using feature recognition and metrological protocols associated with different hearing aid device types.

Accordingly, streamlined requirements for a buildability index algorithm (BIA) development are provided. A software module ascertains real estate availability in an impression, based on the metrological parameters associated with the selected device type(s), selected options, selected vent, directionality and receiver size. Base on these attributes and options, algorithmic computations are invoked to verify whether the selected device(s) is buildable.

The buildability index algorithm (BIA) helps determine whether a given impression meets the minimum metrological requirements to build a prescribed device. The BIA is distinguished from hearing aid modeling software. Rather, BIA facilitates a priori whether a particular device or a set of devices are buildable within an acceptable confidence level represented by its buildability index.

The BIA is a productivity tool for assessing the buildability of hearing aid devices, a utility tool for anyone working to determine whether a given impression can be used to build a wide range of devices using characteristic device metrology and options, a consultative tool for advising end-users by audiologists and hearing aid dispensing professionals, and finally, an extensible tool for batch processing of feature extraction protocols for hearing instrument process automation.

The software utilizes three-dimensional model data, such as that obtained from a 3D scan, as well as characteristic device data. The BIA may be implemented, e.g., entirely as a background process depending on feature recognition and metrological protocols to indicate the buildability of a selected device. A real time update of the BIA index is possible when options, shell types, and receiver types are changed. The software may be run on any mid-to-low end PC available at the time of filing.

Additionally, the BIA can perform automatic selection of the appropriate instrument model or hearing aid device and propose such a model to the dispenser. For instance, in an embodiment, the BIA can permutate all options and instrument model types and indicate to the dispenser based on the input information which applicable instruments models can be built. It is also possible that the dispenser allows the software to decide which model(s) is/are applicable.

Furthermore, the BIA can also compute the appropriate combination of options, receiver types, vents types, and impression type based on a selected device and make a proposal to the dispenser. For example, the customer scans an impression and decides that a Canal Type device is appropriate for the patient, the BIA may then determine what the receiver size, vent type and style, receiver size, and directionality will be to make the impression absolutely buildable. In this situation, the dispenser selects a preferred model and the software determines what options can be allowed on the instrument to render it buildable.

The BIA computation, in a preferred embodiment, is configurable to provide intermediate solutions for patient advisement. As shown below this computation will result in the display of the buildable impressions in the detailed state only (FIG. 12). In this state the dispenser and patient can see the optimized size of the instrument. When the preferred selection is made the final instrument can be displayed.

The BIA, in a preferred embodiment, can provide all possible allowable shell types based on the audiogram, receiver, vent type and style, dimensionality and control options and display a list of completely assembled virtual instruments in 3D to the hearing aid professional or dispenser. Each instrument when selected as shown may be expanded for full viewing by the patient (FIG. 13—showing an intermediate and final computed instrument models using the full 3D functional implementation of the BIA).

DEFINITIONS AND ABBREVIATIONS

The following definitions and abbreviations are used in the following description.

Anti-tragus A warp beneath the concha

Aperture The aperture is the largest contour located at the entrance to the canal that can be realized from a vertical scan of the impression Buildability index A criteria based on physical impression attributes and metrology that determines what devices can be built from a given Buildable Means the instrument either has the minimum dimension required or manufacturing protocols can be evoked to ensure that it can be built Canal The region of a hearing aid instrument or impression bounded by the aperture and the bony section of the ear.

Canal extension Corrective material which is added to the canal tip to removed the jagged end or to correct for length limitation resulting from poor impression or to ensure proper gain Canal height The length of the impression measured from the aperture to the canal tip characteristic device data These refer in options, instrument model, receiver preassembly, and directionality that constitute the internal working of an hearing aid device.

Concha An extensive region of the impression bounded by the aperture, crus and the anti-tragus Concha height The height of a device determined from measuring ~8 mm vertically from the highest point on the concha to intersect a line originating from the lower intertragal notch Concha width An imaginary line/plane projected from the Anti-tragus to intersect a plane along the crus at ~90°.

Crus A valley between the canal and the helix

Detailed impression/shell The final representative detailed device obtained from the undetailed impression Device Device type when used in terms of ITEs means shell type. When used to described hearing instruments in general then it could be BTE or ITE Directionality refers to an electro-acoustic functionality which ensure that two microphones in the hearing instruments are oriented at a prescribed angle to each other First and second bend two curvatures points that occur between the aperture and the canal tip Global offset A constant increment applied globally to the shell to increase its size in order to accommodate for material variability and post processing Local offset A constant increment applied locally to the shell to increase its size in order to accommodate for material variability and post processing Major axis of aperture The long axis of a cross section of an impression taken at the aperture Major axis of canal The long axis of a cross section of an impression Minor axis of aperture The short axis of a cross section of an impression taken at the aperture Minor axis of canal The short axis of a cross section of an impression Shell type Refers to the five key ITEs that are fitted to a patient to assist with hearing or hearing instrument casing type and include ITE (In-the ear), Half Shell, Canal, Mini-Canal and Half Shell Directionality Tragus A trough-shaped indentation at the lower end of the canal Undetailed impression A physical representation of the geometry of the inner ear

| | |
|---|---|
| BI | Buildability Index |
| BIA | Buildability Index Algorithm |
| BINDEX | Buildability Index |
| CA | Canal- hearing aid shell type |
| CIC | Completely-in-the canal. This is an ITE device that fit into the ear canal |
| CS | Customer specified canal length |
| E-W | Concha Width (east, west) |
| FR | Feature Recognition |
| HS | Half shell- hearing aid shell type that fill up approximately half of the "bowl" of the ear |
| ITE | In-the-ear. This is refers to a class of hearing aid instruments usually the full concha type that is embeds in the inner ear canal. |
| MC | Micro canal-hearing aid shell type that fill up the canal of the ear |
| MFG | Manufacturing |
| N-S | Concha Length (north, south) |
| STL | Standard Triangulation Language |
| tol. | Acceptable Computation Tolerance for FR |
| VC | Volume Control |
| w.r.t. | With respect to |

DESCRIPTION OF THE DRAWINGS

The invention is explained in terms of various preferred embodiments, which are explained in more detail below and illustrated by the following drawings.

FIGS. 3A, B is a table illustrating various parameters that may be used for buildability determination;

FIGS. 4A-C are screen shot images illustrating CIC dimensional protocols;

FIGS. 4D-F are screen shot images illustrating MC dimensional protocols;

FIGS. 4G-I are screen shot images illustrating CA dimensional protocols;

FIGS. 4J-L are screen shot images illustrating HS dimensional protocols;

FIG. 5 is an exemplary receiver table illustrating a receiver description and the associated shell types;

FIG. 6 is a feature combination table illustrating a summary of feature combinations that provides an optimal computation of the buildability index;

FIG. 7 is an offset table listing additional configurable parameters in the lookup table for enhancing BIA computation;

FIG. 8 is a computing parameters table listing BIA computing parameters and the relevant manufacturing associated with them;

FIG. 9 is an action table with an identification of limiting BIA cases and corresponding reactive mechanisms;

FIG. 10 is a message table indicating possible error messages for BIA computation failure;

DETAILED DESCRIPTION OF THE PREFERRED EMBODIMENTS

Figure 1:
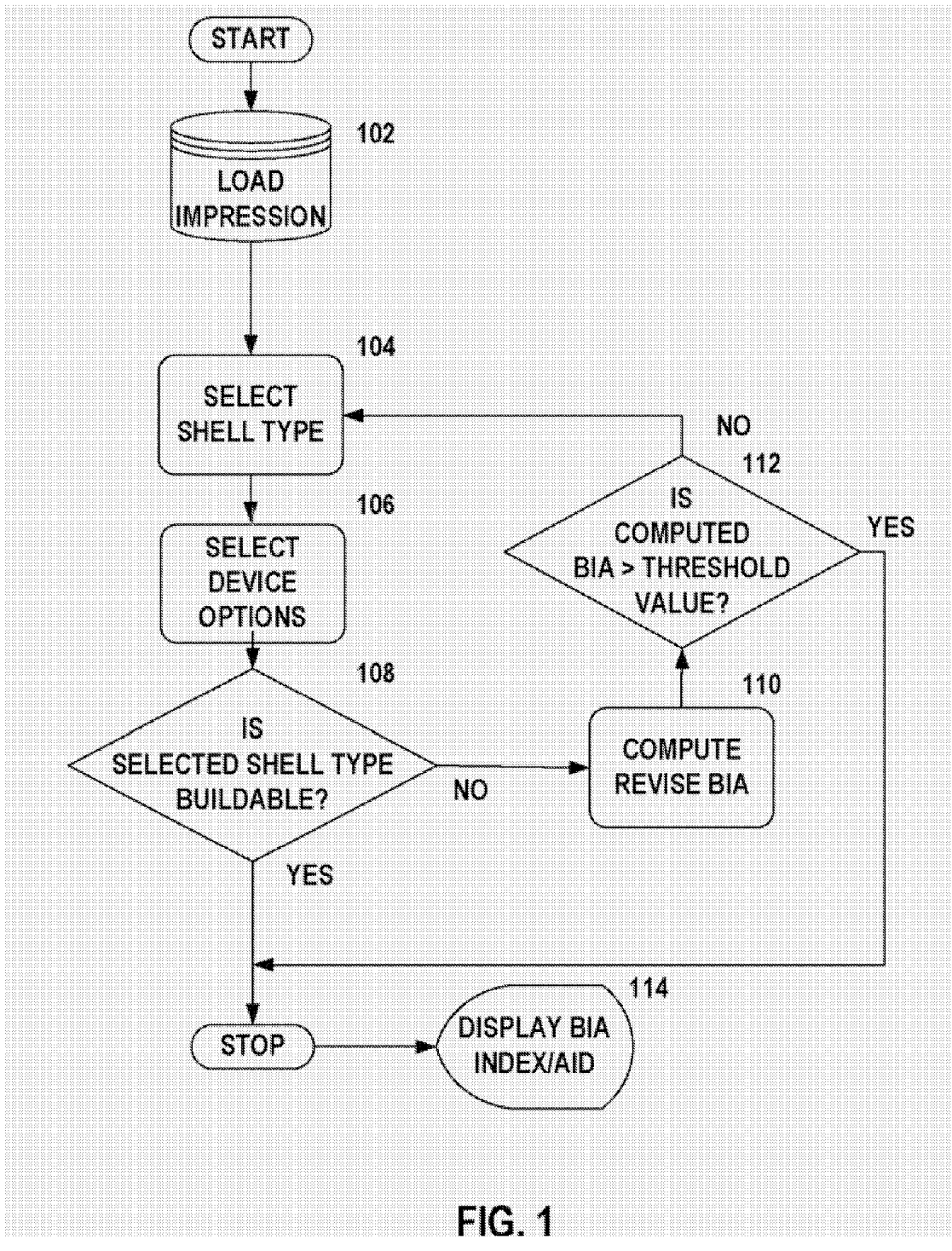
FIG. 1 is a flowchart for an embodiment of the buildability index computation tool.
Figure 11:
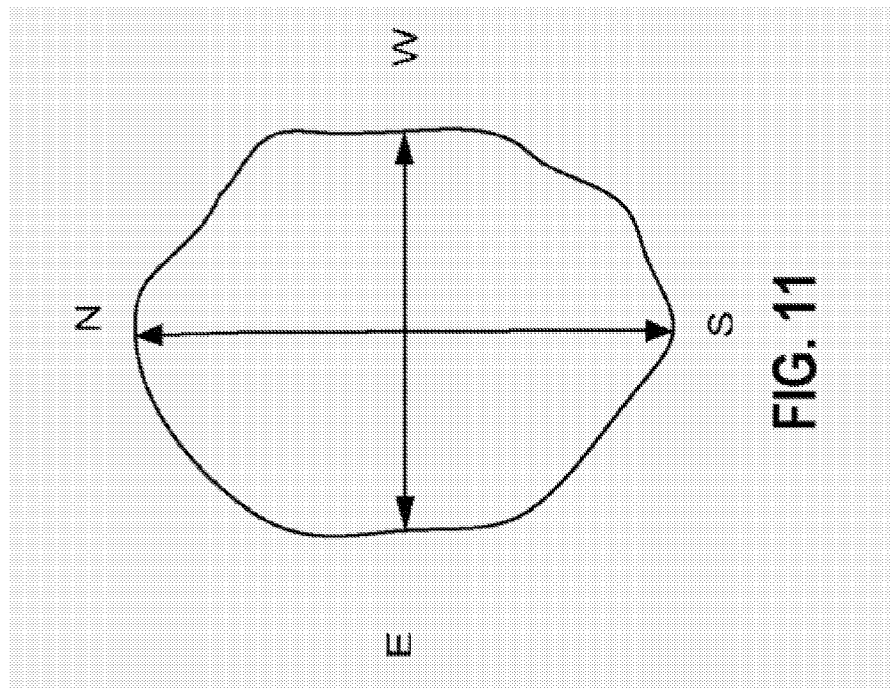
FIG. 11 is a pictorial diagram illustrating the principal features measured along a shell's major and minor axes at the hollow end. All references to N-S and E-W in this document are defined according to this illustration.
Figure 12:
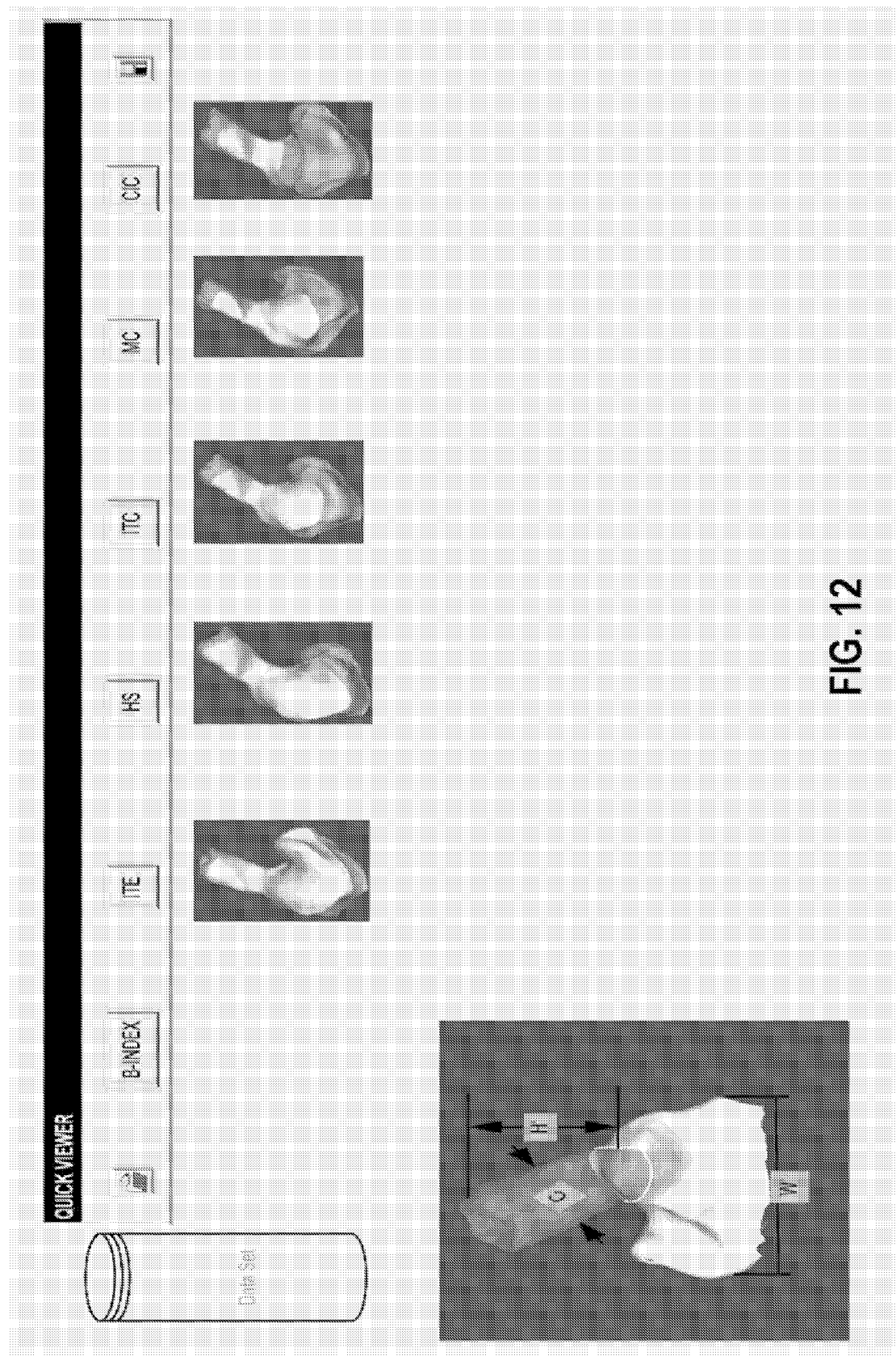
FIG. 12 is an exemplary user interface display of buildable impressions.
Figure 13:
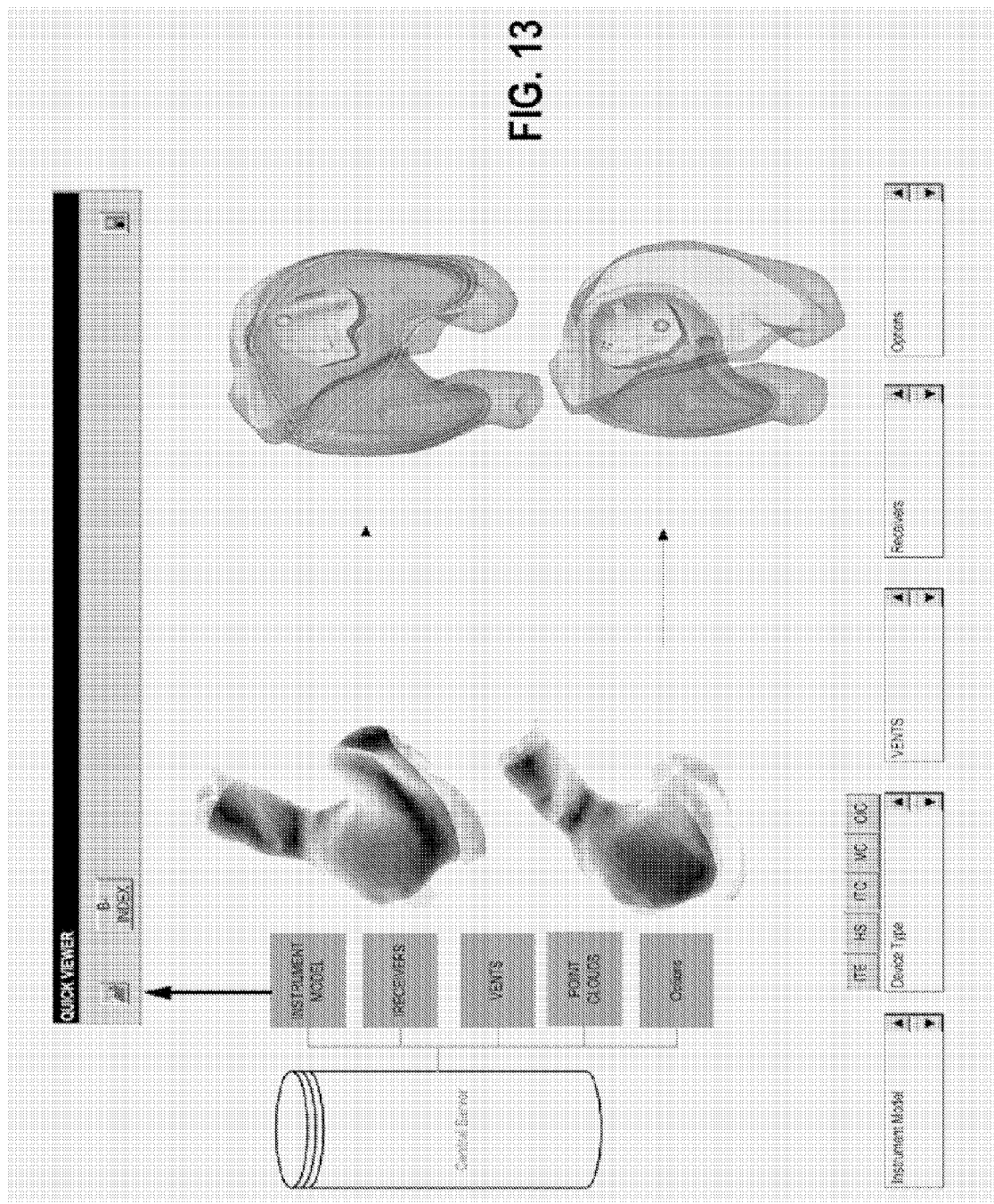
FIG. 13 is an exemplary user interface display of intermediate and final computed instrument models.
Figure 14:
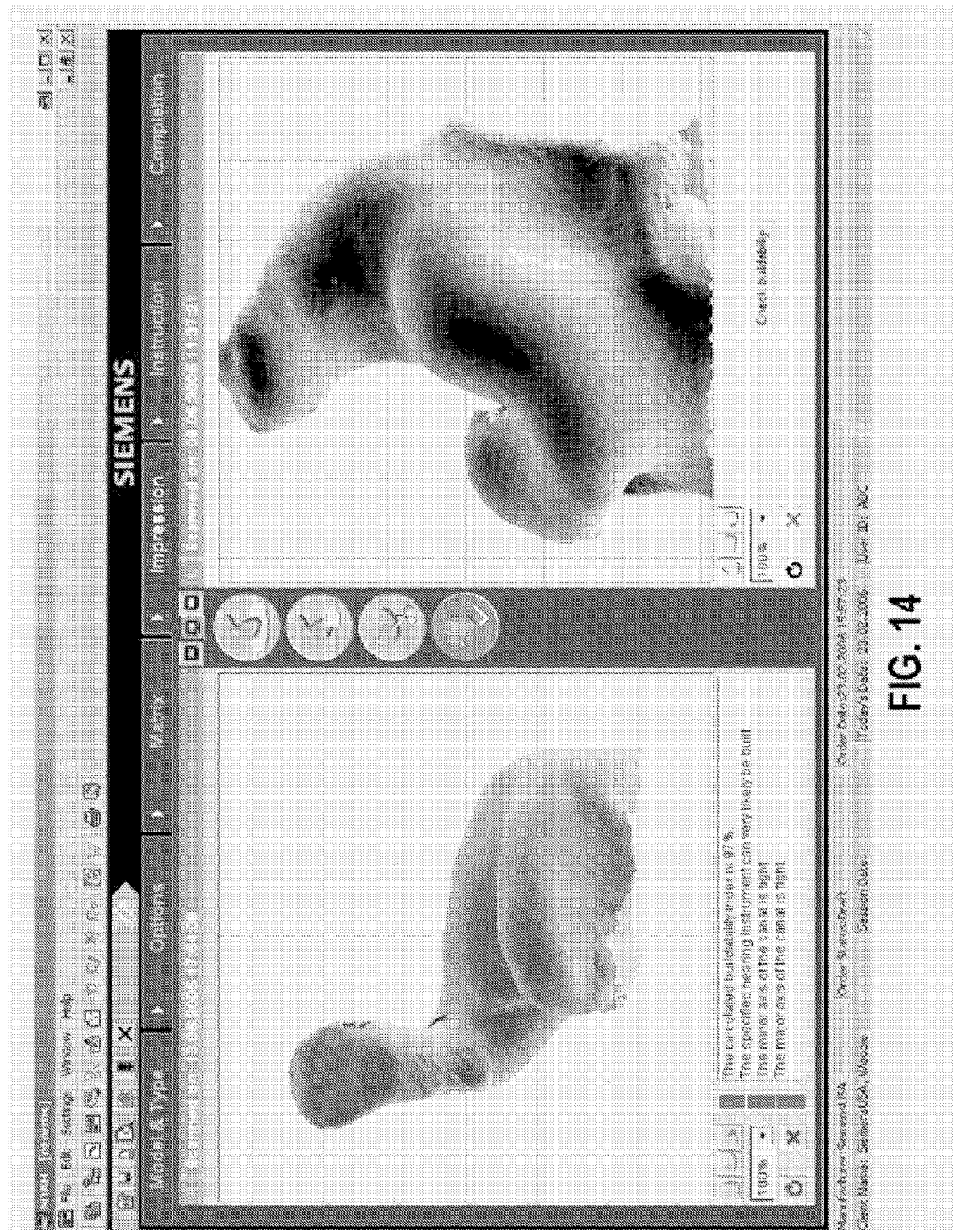
FIG. 14 is an exemplary user interface display of a forms/defined software interface that is output to an external system.

FIG. 1 illustrates a basic overall flow to the system. Accordingly, a user loads an impression from a database or other source (the data for the impression an be acquired, e.g., by a 3D scanner) 102. The user then selects a device/shell type and directionality 104, as well as a number (i.e., quantity) of device options (1, 2, 3, etc.). The BIA software compares extracted dimensions against Look-Up Table values (customizable) for selected devices and options (see the parameter table in FIGS. 4A-E and the receiver table in FIG. 5) and computes a weighted Buildability Index using key measurements in the parameter table of FIGS. 4A-E and receiver table in FIG. 5 to determine if the device is buildable 108. If it is, the process is complete, although a display of the Buildability Index and/or some form of a buildability aid may be displayed 114 to a user or output to another system. Otherwise, the user can update the Buildability Index by selecting additional options and/or replacing options. Changes to the shell type may cause the Buildability Index to update in real time (provided sufficient processing power is utilized). The basic nomenclature that is used in the look up tables to provide a sense of direction of feature measurements can be seen in FIG. 11.

Various aspects of the system are ideally present in a preferred embodiment of the invention. In order to compute the Buildability Index, the BIA software should be able to detect, e.g., the following features from an undetailed impression: identification of Left and Right Impressions; Tragus; the Anti-Tragus; Maximal and Minimal Aperture Diameters; Aperture; Inter-Tragal Notch; Crus; Canal Tip; Concha; Concha Depth; Concha Width; and First and Second Bends. The BIA can extract dimensions from these detected impression features and landmarks, and should be robust and stable in terms of feature recognition. In a preferred embodiment, the BIA extraction protocols are fully automated (i.e., no user interaction is required), and may provide the user with the ability to perform batch processing of the index computation.

Additionally, the BIA software may be configured to compute and generate a work order associated BIA index and detailing parameters such as Prahl Taper and Helix Taper Parameters. A "Prahl Taper" refers to a polynomial shrink of the canal of the shell impression usually initiated from the aperture to the canal tip. It is characterized by an erosion parameter, which is the measure of the required shrink and a maximum reduction parameter, which determines the required reduction in canal length. Helix Taper refers to a polynomial shrink of the helix which begins at the highest point on the helix to a user defined position of the helix.

The BIA software may be further configured to compute the index associated with different work orders and save the information for each work order in a separate file; custom file formats may be used as well as XML or text formatted files, and can compute separate files for a binaural pair work order. BIA feature recognition protocols can be archived for re-use to ensure that when alternate device types, options, etc. are selected, no re-computation of feature recognition occurs. Furthermore, it may be possible to integrate BIA computation with an impression cache service so that the computation of BIA parameters is done in the background in production.

To improve performance of the BIA computation, a preferred embodiment of the invention performs the feature extraction when the software tool is evoked. Subsequent changes to the various BIA determining options can then result in a simple update of the tool rather than a full-blown feature extraction and computation protocols.

The BIA software can compute a minimum available volume in the canal area to determine if a receiver system can fit the prescribed device. Such a volume computation is based on the first and second bend volume and is confirmed using the X, Y, Z of the receiver as defined in FIG. 5. Since the dimensions of the receiver component much be determined so that it fits into the canal, the major and minor axis measurements of the shell in this region are compared to the dimensions of the receiver. Such measurements need to be take along the canal. Ideally, the BIA software utilizes a component-based approach and can be readily adaptable for usage in other products, using any agreed to architecture (e.g., dynamic link libraries, executable files or an embedded source release). The components defined for BIA should be readily portable to other parent software system.

For an embodiment of this type, the software architecture design for interfaces and interactions to existing software components can be defined. The parent application provides parameters, data sets and model options to the BIA. Since the Buildability Index can be configured to act like an algorithm that can be plugged into any parent application, an interface between the parent application and the buildability index function may be provided for passing parameters, which may include the following exemplary parameters: a) a 3D scan of an impression in, e.g., ASCII or STL format with nomenclature in alphanumeric format (e.g., up to 10 combination of numbers and characters); b) a side of impression added to the nomenclature (Left, L or Right, R); c) the canal length (CS, DP, LN, MD, SH); d) the shell type (ST, HS, MC, CIC, CA, LP); d) the number of controls in the range of 0 to 3; e) the diametrical vent size); f) the receiver size (dimensions X, Y, Z) for each type as defined in the lookup table in FIG. 5); g) tolerance (tol.); and h) BIA threshold value.

When a parent application is utilized, the BIA returns the result of the buildability calculation as a value in % to the parent application and may also provide a report of all Buildability Indexes for multiple device types along with an indication of reasons why failed devices are not buildable.

Device Computations

The BIA software computes a buildability index for each device type base on metrological parameters of the device.

Each device or shell types may be detailed and modeled based on dimensions obtained from landmarks that can include the Tragus; the Anti-Tragus; Maximal and Minimal Aperture Diameters; Aperture; Inter-Tragal Notch; Crus; Canal Tip; Concha; Concha Depth; Concha Width; and First and Second Bends. The buildability index can be expressed as a weighted percentage of the relevant shell feature as defined in FIGS. 3A and 3B, and this can be computed as an average of the partial fractions or percentages of the metrological contributions of essential parameters. The tolerance (tol) value can be influenced by the parent application based on the accuracy required in a local market. It can compute buildability for a binaural pair, can determine canal length based on first and second bends, and permits a user to be able to select the canal lengths as "Short," "Medium," and "Long".

The BIA software may be configured to provide a mechanism for a user to create a customizable table or database populated with parameters of each device class and associated options for computing buildability index. These parameters may include, but are not limited to: device or shell types (HS, CA, etc.), number of options (1, 2, 3), receiver pre-assembly type, receiver size, essential parameters of devices (as defined in FIG. 6), canal length, as measured from the aperture to the canal tip, vent styles, and vent diameters. Some manufacturing location may have different marketing needs based on demographics and instrument types. In such situations, the look up tables can be readily adapted for those needs.

When the BIA software is utilized in conjunction with a parent application, site specific and/or default lookup tables are correspondingly installed.

User can select the receiver assembly type as shown in FIG. 7 (in a Standalone Mode), and the BIA software can accept the receiver assembly dimensions from the parent application to use in the computation of BIA. The look up table may have a section indicating the receiver assembly and its corresponding dimension as outlined in FIG. 7.

FIGS. 3A and B provide a table containing parameters for buildability determination. Note that dimensional attributes are configurable base on electronics, receivers, number of options, etc.

Customizable Look up Parameter Table

Table 1, below, illustrates the look-up parameter tables containing parameters for shell types, including ITE, HS, HS Directional, CA and MC, that have configurable manufacturing specific parameters. These configurable parameters include those that influence the Buildability Index as indicated by the tables in Table 1 and FIG. 5. The flexibility in the adaptation of the software to a particular market is achievable through the customizable look up table and the tolerance tol values as provided from the parent application.

TABLE 1

| Shell Type | Options | Vent Size | Concha Depth (mm) | EXW | NxS | Device Length |
|---|---|---|---|---|---|---|
| MC | 0-control | NV = 0 | 8 | 8.5 | 13.00 | 15.00 |
| MC | 1-control | NV = 0 | 8 | 8.5 | 13.00 | 15.00 |
| MC | 0-control | PV = 1.3 | 8 | 8.5 | 13.00 | 15.00 |
| MC | 1-control | PV = 1.3 | 8 | 8.5 | 13.00 | 15.00 |
| MC | 0-control | VS = 1.4 | 8 | 8.5 | 13.00 | 15.00 |
| MC | 1-control | VS = 1.4 | 8 | 8.5 | 13.00 | 15.00 |
| MC | 0-control | VM = 2.5 | 8 | 8.5 | 13.00 | 15.00 |
| MC | 1-control | VM = 2.5 | 8 | 8.5 | 13.00 | 15.00 |
| CA | 0-control | NV = 0 | 8 | 11.0 | 13.00 | 17.00 |
| CA | 1-control | NV = 0 | 8 | 11.0 | 13.00 | 17.00 |
| CA | 2-control | NV = 0 | 8 | 11.0 | 13.00 | 17.00 |
| CA | 3-control | NV = 0 | 8 | 11.0 | 13.00 | 17.00 |
| CA | 0-control | PV = 1.3 | 8 | 11.0 | 13.00 | 17.00 |
| CA | 1-control | PV = 1.3 | 8 | 11.0 | 13.00 | 17.00 |
| CA | 2-control | PV = 1.3 | 8 | 11.0 | 13.00 | 17.00 |
| CA | 3-control | PV = 1.3 | 8 | 11.0 | 13.00 | 17.00 |
| CA | 0-control | VS = 1.4 | 8 | 11.0 | 13.00 | 17.00 |
| CA | 1-control | VS = 1.4 | 8 | 11.0 | 13.00 | 17.00 |
| CA | 2-control | VS = 1.4 | 8 | 11.0 | 13.00 | 17.00 |
| CA | 3-control | VS = 1.4 | 8 | 11.0 | 13.00 | 17.00 |
| CA | 0-control | VM = 2.5 | 8 | 11.0 | 13.00 | 17.00 |
| CA | 1-control | VM = 2.5 | 8 | 11.0 | 13.00 | 17.00 |
| CA | 2-control | VM = 2.5 | 8 | 11.0 | 13.00 | 17.00 |
| CA | 3-control | VM = 2.5 | 8 | 11.0 | 13.00 | 17.00 |
| CA-Directional | 0-control | NV = 0 | 8 | 11.0 | 14.00 | 17.00 |
| CA-Directional | 1-control | NV = 0 | 8 | 11.0 | 14.00 | 17.00 |
| CA-Directional | 2-control | NV = 0 | 8 | 11.0 | 14.00 | 17.00 |
| CA-Directional | 3-control | NV = 0 | 8 | 11.0 | 14.00 | 17.00 |
| CA-Directional | 0-control | PV = 1.3 | 8 | 11.0 | 14.00 | 17.00 |
| CA-Directional | 1-control | PV = 1.3 | 8 | 11.0 | 14.00 | 17.00 |
| CA-Directional | 2-control | PV = 1.3 | 8 | 11.0 | 14.00 | 17.00 |
| CA-Directional | 3-control | PV = 1.3 | 8 | 11.0 | 14.00 | 17.00 |
| CA-Directional | 0-control | VS = 1.4 | 8 | 11.0 | 14.00 | 17.00 |
| CA-Directional | 1-control | VS = 1.4 | 8 | 11.0 | 14.00 | 17.00 |
| CA-Directional | 2-control | VS = 1.4 | 8 | 11.0 | 14.00 | 17.00 |
| CA-Directional | 3-control | VS = 1.4 | 8 | 11.0 | 14.00 | 17.00 |
| CA-Directional | 0-control | VM = 2.5 | 8 | 11.0 | 14.00 | 17.00 |
| CA-Directional | 1-control | VM = 2.5 | 8 | 11.0 | 14.00 | 17.00 |
| CA-Directional | 2-control | VM = 2.5 | 8 | 11.0 | 14.00 | 17.00 |
| CA-Directional | 3-control | VM = 2.5 | 8 | 11.0 | | 17.00 |
| HS | 0-control | NV = 0 | 8 | 13.0 | 13.00 | 17.00 |
| HS | 1-control | NV = 0 | 8 | 13.0 | 13.00 | 17.00 |
| HS | 2-control | NV = 0 | 8 | 13.0 | 13.00 | 17.00 |
| HS | 3-control | NV = 0 | 8 | 13.0 | 13.00 | 17.00 |
| HS | 0-control | PV = 1.3 | 8 | 13.0 | 13.00 | 17.00 |
| HS | 1-control | PV = 1.3 | 8 | 13.0 | 13.00 | 17.00 |
| HS | 2-control | PV = 1.3 | 8 | 13.0 | 13.00 | 17.00 |
| HS | 3-control | PV = 1.3 | 8 | 13.0 | 13.00 | 17.00 |
| HS | 0-control | VS = 1.4 | 8 | 13.0 | 13.00 | 17.00 |
| HS | 1-control | VS = 1.4 | 8 | 13.0 | 13.00 | 17.00 |
| HS | 2-control | VS = 1.4 | 8 | 13.0 | 13.00 | 17.00 |
| HS | 3-control | VS = 1.4 | 8 | 13.0 | 13.00 | 17.00 |
| HS | 0-control | VM = 2.5 | 8 | 13.0 | 13.00 | 17.00 |
| HS | 1-control | VM = 2.5 | 8 | 13.0 | 13.00 | 17.00 |
| HS | 2-control | VM = 2.5 | 8 | 13.0 | 13.00 | 17.00 |
| HS | 3-control | VM = 2.5 | 8 | 13.0 | 13.00 | 17.00 |
| HS | 0-control | VL = 3.0 | 8 | 13.0 | 13.00 | 17.00 |
| HS | 1-control | VL = 3.0 | 8 | 13.0 | 13.00 | 17.00 |
| HS | 2-control | VL = 3.0 | 8 | 13.0 | 13.00 | 17.00 |
| HS | 3-control | VL = 3.0 | 8 | 13.0 | 13.00 | 17.00 |
| HS Directional | 0-control | NV = 0 | 8 | 13.0 | 14.00 | 17.00 |
| HS Directional | 1-control | NV = 0 | 8 | 13.0 | 14.00 | 17.00 |

TABLE 1-continued

| Shell Type | Options | Vent Size | Concha Depth (mm) | EXW | NxS | Device Length |
|---|---|---|---|---|---|---|
| HS Directional | 2-control | NV = 0 | 8 | 13.0 | 14.00 | 17.00 |
| HS Directional | 3-control | NV = 0 | 8 | 13.0 | 14.00 | 17.00 |
| HS Directional | 0-control | PV = 1.3 | 8 | 13.0 | 14.00 | 17.00 |
| HS Directional | 1-control | PV = 1.3 | 8 | 13.0 | 14.00 | 17.00 |
| HS Directional | 2-control | PV = 1.3 | 8 | 13.0 | 14.00 | 17.00 |
| HS Directional | 3-control | PV = 1.3 | 8 | 13.0 | 14.00 | 17.00 |
| HS Directional | 0-control | VS = 1.4 | 8 | 13.0 | 14.00 | 17.00 |
| HS Directional | 1-control | VS = 1.4 | 8 | 13.0 | 14.00 | 17.00 |
| HS Directional | 2-control | VS = 1.4 | 8 | 13.0 | 14.00 | 17.00 |
| HS Directional | 3-control | VS = 1.4 | 8 | 13.0 | 14.00 | 17.00 |
| HS Directional | 0-control | VM = 2.5 | 8 | 13.0 | 14.00 | 17.00 |
| HS Directional | 1-control | VM = 2.5 | 8 | 13.0 | 14.00 | 17.00 |
| HS Directional | 2-control | VM = 2.5 | 8 | 13.0 | 14.00 | 17.00 |
| HS Directional | 3-control | VM = 2.5 | 8 | 13.0 | 14.00 | 17.00 |
| HS Directional | 0-control | VL = 3.0 | 8 | 13.0 | 14.00 | 17.00 |
| HS Directional | 1-control | VL = 3.0 | 8 | 13.0 | 14.00 | 17.00 |
| HS Directional | 2-control | VL = 3.0 | 8 | 13.0 | 14.00 | 17.00 |
| HS Directional | 3-control | VL = 3.0 | 8 | 13.0 | 14.00 | 17.00 |
| ITE | 1-control | NV = 0 | 8 | 13.0 | 15.00 | 18.00 |
| ITE | 2-control | NV = 0 | 8 | 13.0 | 15.00 | 18.00 |
| ITE | 3-control | NV = 0 | 8 | 13.0 | 15.00 | 18.00 |
| ITE | 4-control | NV = 0 | 8 | 13.0 | 15.00 | 18.00 |
| ITE | 5-control | NV = 0 | 8 | 13.0 | 15.00 | 13.85 |
| ITE | 0-control | PV = 1.3 | 8 | 13.0 | 15.00 | 18.00 |
| ITE | 1-control | PV = 1.3 | 8 | 13.0 | 15.00 | 18.00 |
| ITE | 2-control | PV = 1.3 | 8 | 13.0 | 15.00 | 18.00 |
| ITE | 3-control | PV = 1.3 | 8 | 13.0 | 15.00 | 18.00 |
| ITE | 4-control | PV = 1.3 | 8 | 13.0 | 15.00 | 18.00 |
| ITE | 5-control | PV = 1.3 | 8 | 13.0 | 15.00 | 18.00 |
| ITE | 0-control | VS = 1.4 | 8 | 13.0 | 15.00 | 18.00 |
| ITE | 1-control | VS = 1.4 | 8 | 13.0 | 15.00 | 18.00 |
| ITE | 2-control | VS = 1.4 | 8 | 13.0 | 15.00 | 18.00 |
| ITE | 3-control | VS = 1.4 | 8 | 13.0 | 15.00 | 18.00 |
| ITE | 4-control | VS = 1.4 | 8 | 13.0 | 15.00 | 18.00 |
| ITE | 5-control | VS = 1.4 | 8 | 13.0 | 15.00 | 18.00 |
| ITE | 0-control | VM = 2.5 | 8 | 13.0 | 15.00 | 18.00 |
| ITE | 1-control | VM = 2.5 | 8 | 13.0 | 15.00 | 18.00 |
| ITE | 2-control | VM = 2.5 | 8 | 13.0 | 15.00 | 18.00 |
| ITE | 3-control | VM = 2.5 | 8 | 13.0 | 15.00 | 18.00 |
| ITE | 4-control | VM = 2.5 | 8 | 13.0 | 15.00 | 18.00 |
| ITE | 5-control | VM = 2.5 | 8 | 13.0 | 15.00 | 18.00 |
| ITE | 0-control | VL = 3.0 | 8 | 13.0 | 15.00 | 18.00 |
| ITE | 1-control | VL = 3.0 | 8 | 13.0 | 15.00 | 18.00 |
| ITE | 2-control | VL = 3.0 | 8 | 13.0 | 15.00 | 18.00 |
| ITE | 3-control | VL = 3.0 | 8 | 13.0 | 15.00 | 18.00 |
| ITE | 4-control | VL = 3.0 | 8 | 13.0 | 15.00 | 18.00 |
| ITE | 5-control | VL = 3.0 | 8 | 13.0 | 15.00 | 18.00 |
| LP | 0-control | NV = 0 | 8 | 13.0 | 15.00 | 18.00 |
| LP | 1-control | NV = 0 | 8 | 13.0 | 15.00 | 18.00 |
| LP | 2-control | NV = 0 | 8 | 13.0 | 15.00 | 18.00 |
| LP | 3-control | NV = 0 | 8 | 13.0 | 15.00 | 18.00 |
| LP | 4-control | NV = 0 | 8 | 13.0 | 15.00 | 18.00 |
| LP | 5-control | NV = 0 | 8 | 13.0 | 15.00 | 18.00 |
| LP | 0-control | PV = 1.3 | 8 | 13.0 | 15.00 | 18.00 |
| LP | 1-control | PV = 1.3 | 8 | 13.0 | 15.00 | 18.00 |
| LP | 2-control | PV = 1.3 | 8 | 13.0 | 15.00 | 18.00 |
| LP | 3-control | PV = 1.3 | 8 | 13.0 | 15.00 | 18.00 |
| LP | 4-control | PV = 1.3 | 8 | 13.0 | 15.00 | 18.00 |
| LP | 5-control | PV = 1.3 | 8 | 13.0 | 15.00 | 18.00 |
| LP | 0-control | VS = 1.4 | 8 | 13.0 | 15.00 | 18.00 |
| LP | 1-control | VS = 1.4 | 8 | 13.0 | 15.00 | 18.00 |
| LP | 2-control | VS = 1.4 | 8 | 13.0 | 15.00 | 18.00 |
| LP | 3-control | VS = 1.4 | 8 | 13.0 | 15.00 | 18.00 |
| LP | 4-control | VS = 1.4 | 8 | 13.0 | 15.00 | 18.00 |
| LP | 5-control | VS = 1.4 | 8 | 13.0 | 15.00 | 18.00 |
| LP | 0-control | VM = 2.5 | 8 | 13.0 | 15.00 | 18.00 |
| LP | 1-control | VM = 2.5 | 8 | 13.0 | 15.00 | 18.00 |
| LP | 2-control | VM = 2.5 | 8 | 13.0 | 15.00 | 18.00 |
| LP | 3-control | VM = 2.5 | 8 | 13.0 | 15.00 | 18.00 |
| LP | 4-control | VM = 2.5 | 8 | 13.0 | 15.00 | 18.00 |
| LP | 5-control | VM = 2.5 | 8 | 13.0 | 15.00 | 18.00 |
| LP | 0-control | VL = 3.0 | 8 | 13.0 | 15.00 | 18.00 |
| LP | 1-control | VL = 3.0 | 8 | 13.0 | 15.00 | 18.00 |
| LP | 2-control | VL = 3.0 | 8 | 13.0 | 15.00 | 18.00 |
| LP | 3-control | VL = 3.0 | 8 | 13.0 | 15.00 | 18.00 |
| LP | 4-control | VL = 3.0 | 8 | 13.0 | 15.00 | 18.00 |
| LP | 5-control | VL = 3.0 | 8 | 13.0 | 15.00 | 18.00 |
| HX | 0-control | NV = 0 | 8 | 13.0 | 15.00 | 18.00 |

Look-Up Parameter Table Containing Parameters for Shell Types

Figure 4M:
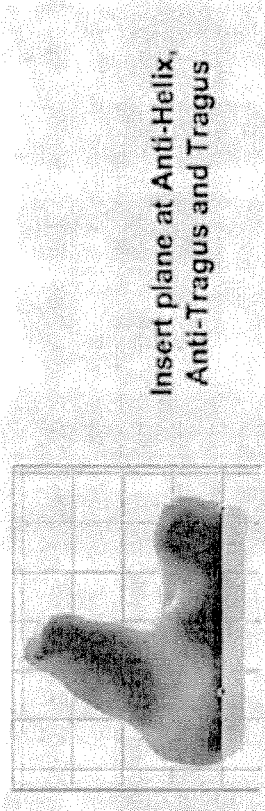
FIGS. 4M-Q are screen shot images illustrating ITE dimensional protocols.
Figure 4N:
Figure 4O:
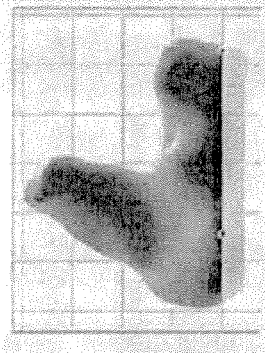
Figure 4P:
Figure 4Q:
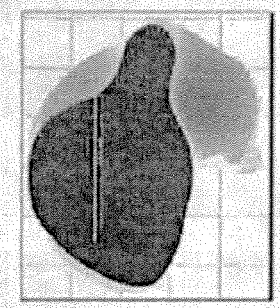

The various dimensional protocols for different shell types are illustrated in FIGS. 4A-Q.

FIG. 5 is an exemplary receiver table containing a receiver description and the associated shell types.

FIG. 6 is a feature combination table illustrating a summary of feature combinations that provides an optimal computation of the buildability index.

Determination of Buildability Index

The buildability index is determined by the following equations:

$$\_bia = \frac{1}{n}\sum_{i=1}^{n} \min\left(\frac{L_m^i - L_r^i}{L_t^i} + 1.0, 1.0\right) \quad (1)$$

$$bia = \max(\_bia, 0.0) \quad (2)$$

In equation (1), $L_m^i$ is the measure value of feature i;

$L_r^i$ is the required value of feature i; and $L_t^i$ is the given tolerance value of feature i This formulation averages the dimensional requirements of all feature metrics. The min operator used in the formula serves for such purpose: if the feature measurement value is larger than what is required, then it is not valued by more than 1.0. However if an individual feature measurement value is less than the required value by more than the tolerance, the corresponding effect can be negative.

In the equation (2), the BIA is minimized to be 0.0 instead of a negative value. The following is an illustrative example. Suppose there are 3 features:

feature 1: $L_m^1 = 5.2$ $L_r^1 = 4.8$ $L_t^1 = 0.12$ feature 2: $L_m^2 = 3.3$ $L_r^2 = 4.0$ $L_t^2 = 0.10$ feature 3: $L_m^3 = 5.8$ $L_r^3 = 6.0$ $L_t^3 = 0.15$ This yields, $$\_bia = \frac{1}{3}\begin{pmatrix} \min\left(1, \frac{5.2-4.8}{0.12}+1\right) \\ +\min\left(1, \frac{3.3-4.0}{0.1}+1\right) \\ +\min\left(1, \frac{5.9-6.0}{0.15}+1\right) \end{pmatrix}$$

$$= \frac{1}{3}(1.0 - 6.0 + 0.33)$$

$$= -1.557$$

$$bia = \max(-1.557, 0) = 0$$

It should be noted that, in this formulation, if $L_m^i - L_r^i < -nL_t^i$, regardless of all other features, _bia will be negative or zero, and then bia will be zero. So, if one feature size is less than the required length by n times of the corresponding tolerance value, the total number of features, the BIA is zero. In order to have final buildability index of 1, or 100%, all the feature measurement values must be larger than the required feature values to make their corresponding terms equal 1. This calculation provides an assessment of buildability ranging from 1 to 0, i.e., from a more buildable to a less buildable configuration.

Figure 2:
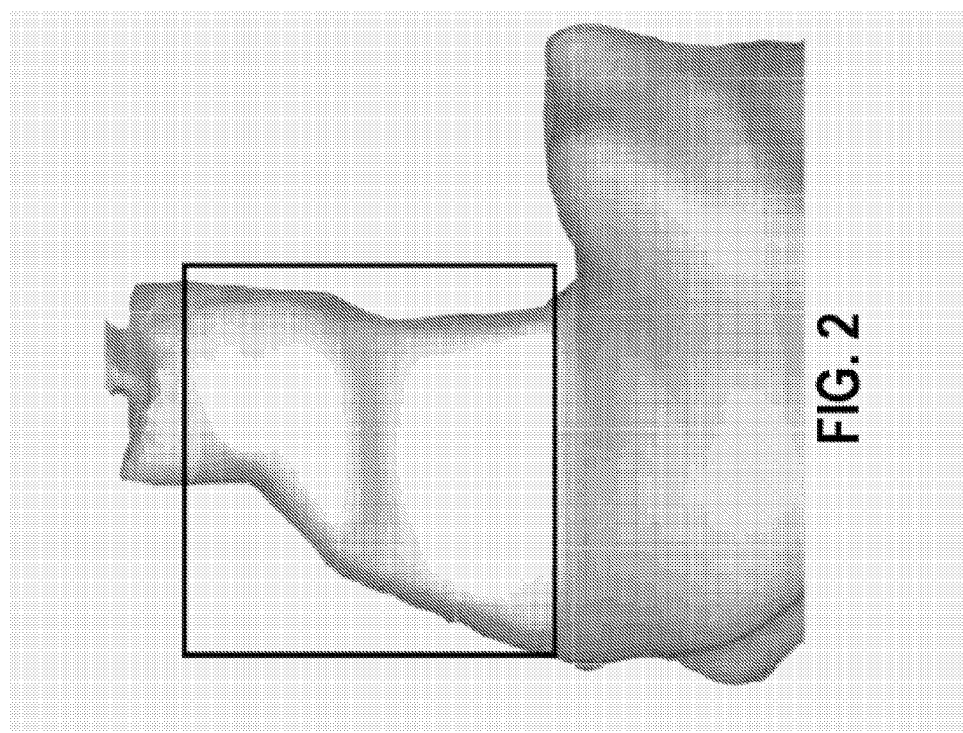
FIG. 2 is a pictorial image illustrating the region of an impression used for the BIA Index computation.

FIG. 2 shows a typical region of an impression used for CIC BIA Index computation. The BIA software may provide to the user the section of the impression that was used in the computation of the buildability index, and this can be done by, e.g., creating a transparency image by the parent application. Ideally, the BIA specifies the requirements on the algorithm only and does not include the GUI (a part of an external application). In this configuration, the user is able to configure the color of the transparency in the parent application, as well as the opacity of the transparency, and provide a way to differentially configure the transparency for a "detailed" impression and the original impression The computation of BIA index can be modified to accommodate current manufacturing intervention protocols. If the buildability index is below a configurable value, the BIA can perform additional computations and provide feedback to the user. For example, a current implementation of BIA can be maintained as long as the computed index is greater than or equals some configurable value (e.g., <65%) (which may be provided as an interface parameter by the application which uses the BIA). A Preferences Table can support a limiting value for the BIA Index (a configurable BIA Index may be used in standalone mode for testing purposes).

The BIA can provide additional configurable parameters in its look up table as illustrated in the offset table of FIG. 7 to support manufacturing intervention protocols. These parameters can be configured based on current manufacturing defined preferences. The BIA may incorporate these values into the index computation when the computed value is below the configuration value. The BIA can also identify and utilize the relevant intervention protocols associated with computed parameters in the determination of the index value (see the table in FIG. 8). For example, if the canal length is shorter than configured value, the BIA can identify that the canal extension is the relevant manufacturing parameter to address.

If the Buildability Index is below a configurable value (e.g., 65%), the BIA then: a) compares the differences between the configured values and the measured values; and b) then compares the differences against the relevant manufacturing intervention protocols.

By way of a illustrative first example:
Configured Canal length=14 mm;
Measured Canal length=13.7 mm;

This implies a difference of 0.3 mm. The BIA computations verify that this value is within the range of acceptable intervention protocols for canal height, and weight the parameters accordingly. If the differences are within the range of the intervention protocols, the BIA then recomputes the Buildability Index based on the intervention protocols and the measured parameters. For instance, if the difference is 0.3 mm (from Example 1), the BIA knows that this value is within the acceptable manufacturing protocol range and use 14 mm instead of 13.7 mm in the computation of the index. The BIA provides only the "revised" BIA Index, the limiting case message, and the relevant intervention protocols as described by the action table listed in FIG. 9.

In a second example, the canal length exceeds the limiting case. In this example, as message may be provided, e.g., Message="Canal Length is short by X.XX mm"; Action="Canal Extension is required".

In general, if the BIA computation fails (i.e., the resulting BIA Index is lower than the configured threshold value), after the intervention protocols have been invoked, then the BIA can provide to the user e.g., one of four messages or associated identifiers identified in the message table shown in FIG. 10. If the BIA is greater than the threshold value, but less than 100%, then the BIA can provide to the parent application all possible limiting cases and corresponding messages. If the buildability index is 100%, then the BIA can pass to the parent application the message, "Impression is good for CIC (or ITE, HS, CA, MC, as the case may be).

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is necessary to the practice of the invention unless the element is specifically described as being so. Numerous modifications and adaptations will be readily apparent to those skilled in this art without departing from the spirit and scope of the present invention.

What is claimed is:

1. A method for providing a buildability index for a hearing aid device shell design to a user, comprising:
    creating a predefined parameter table comprising parameters to utilize for a buildability determination;
    obtaining a set of impression shape data for a specific device;
    selecting a shell type from a predefined list of shell types;
    selecting a number of device options;
    computing a buildability index based on the impression shape data, the selected shell type, the selected number of device options, data obtained from the parameter table, and data obtained from a receiver table;
    outputting the buildability index to at least one of a display of a user interface device and an external system.

2. The method according to claim 1, further comprising:
    creating a configurable buildability threshold value;
    providing a status or message to at least one of the display and the external system according to whether the computed buildability index is 100%, between 100% and the buildability threshold value, or below the buildability threshold value.

3. The method according to claim 1, wherein the shell type is selected from the group consisting of in-the-ear, half shell, canal, micro canal, and half shell directional.

4. The method according to claim 1, wherein the number of device options is an integer value that is between one and three, inclusive.

5. The method according to claim 1, wherein the buildability index is calculated to be either a number between 0 and 1 or a percentage between 0% and 100%.

6. The method according to claim 5, wherein the buildability index bia is calculated according to the following formulas:

$$\_bia = \frac{1}{n} \sum_{i=1}^{n} \min\left(\frac{L_m^i - L_r^i}{L_t^i} + 1.0, 1.0\right) \quad (1)$$

$$bia = \max(\_bia, 0.0) \quad (2)$$

wherein in equation (1),
    $L_m^i$ is the measure value of feature i;
    $L_r^i$ is the required value of feature i; and
    $L_t^i$ is the given tolerance value of feature i.

7. The method according to claim 1, further comprising:
    detecting the following features from an undetailed impression as the impression shape data: identification of Left and Right Impressions; Tragus; the Anti-Tragus; Maximal and Minimal Aperture Diameters; Aperture; Inter-Tragal Notch; Crus; Canal Tip; Concha; Concha Depth; Concha Width; and First and Second Bends.

8. The method according to claim 1, further comprising:
    accepting, from the user, input related to additional or alternative device options; and
    recalculating the buildability index based on the user input.

9. The method according to claim 8, wherein the buildability index updates in real-time, based on the user input.

10. The method according to claim 1, further comprising:
    determining actions to take base on determined limiting cases selected from the group consisting of: canal height, minor axis of canal, major axis of canal, minor axis of aperture, major axis of aperture, canal depth, and canal width or breadth.

11. The method according to claim 1, further comprising:
    determining a problem cause for a low buildability index calculation; and
    outputting a message to the user interface or external system associated with the problem cause.

12. The method according to claim 1, further comprising:
    providing a display of a user interface device; and
    outputting on the display a section of the impression corresponding to a portion utilized for the computing of the buildability index.

13. The method according to claim 1, further comprising:
    including additional configuration offsets in the computing of the buildability offsets selected from the group consisting of a canal extension for a canal height and global and local offsets for a minor axis of a canal, a major axis of the canal, a minor axis of an aperture, a major axis of the aperture, a canal depth, and a canal width.

14. The method according to claim 1, further comprising:
    providing the bases for computing the buildability index automatically; and
    performing a batch processing of the buildability index.

15. The method according to claim 14, wherein multiple said bases for computing are provided automatically.

16. The method according to claim 1, further comprising:
    generating a work order associated with the buildability index; and
    saving the work order in a file.

17. The method according to claim 16, wherein the file is an XML or text-formatted file.

18. The method according to claim 1, further comprising:
    computing a minimum available volume in a canal area to determine if a receiver system can fit in the device; and
    confirming the fit of the receiver system in the device by utilizing x, y and z parameters of the receiver system stored in the receiver table.

19. The method according to claim 1, wherein the buildability index is output to an external system via a defined software interface.

20. A system for providing a buildability index for a hearing aid device shell design to a user, comprising:
    a predefined parameter table comprising parameters to utilize for a buildability determination;
    a set of impression shape data for a specific device;
    a list of shell types;
    a number of device options;
    a receiver table;
    a software module that computes a buildability index based on the impression shape data, the selected shell type, the selected number of device options, data obtained from the parameter table, and data obtained from the receiver table; and
    an output via which the buildability index is sent to at least one of a display of a user interface device and an external system.

* * * * *